US008776857B1

(12) United States Patent
Jackson et al.

(10) Patent No.: US 8,776,857 B1
(45) Date of Patent: Jul. 15, 2014

(54) LABEL APPLICATION DEVICES

(71) Applicants: Richard Jackson, North Ferriby (GB); Kevin Nobbs, Hessle (GB)

(72) Inventors: Richard Jackson, North Ferriby (GB); Kevin Nobbs, Hessle (GB)

(73) Assignee: Computype, Inc., St. Paul, MN (US)

( * ) Notice: Subject to any disclaimer, the term of this patent is extended or adjusted under 35 U.S.C. 154(b) by 0 days.

(21) Appl. No.: 13/758,748

(22) Filed: Feb. 4, 2013

(51) Int. Cl.
*B29C 63/00* (2006.01)

(52) U.S. Cl.
USPC ........... 156/767; 156/230; 156/240; 156/247; 156/248; 156/249; 156/277; 156/387; 156/540; 156/541; 156/542; 156/714; 156/716; 156/718; 156/719; 156/750; 156/764; 156/765

(58) Field of Classification Search
USPC ......... 156/230, 277, 384, 387, 750, 751, 759, 156/DIG. 24, 238–240, 247–249, 540–542, 156/714–719, 764–767, 556, 566, 569, 156/DIG. 28, DIG. 33, DIG. 47, DIG. 49; 101/34, 401.1; 235/488
See application file for complete search history.

(56) References Cited

U.S. PATENT DOCUMENTS

| | | | | |
|---|---|---|---|---|
| 4,019,947 | A | 4/1977 | Stock et al. | |
| 4,490,207 | A | 12/1984 | Achelpohl | |
| 4,758,303 | A * | 7/1988 | Shastko | 156/542 |
| 5,017,257 | A * | 5/1991 | Murphy | 156/268 |
| 5,104,473 | A * | 4/1992 | Tveit et al. | 156/268 |
| 5,865,918 | A * | 2/1999 | Franklin et al. | 156/64 |
| 5,876,555 | A * | 3/1999 | Hellsund et al. | 156/540 |
| 5,897,741 | A | 4/1999 | Mills et al. | |
| 5,938,890 | A * | 8/1999 | Schlinkmann et al. | 156/541 |
| 6,182,730 | B1 | 2/2001 | Muir | |
| 6,786,263 | B1 | 9/2004 | Fox, Jr. et al. | |
| 7,116,343 | B2 * | 10/2006 | Botten et al. | 347/218 |
| 7,185,689 | B2 * | 3/2007 | Jenkins et al. | 156/540 |
| 7,601,238 | B2 | 10/2009 | Takahashi | |
| 8,033,312 | B2 | 10/2011 | Fries et al. | |
| 2011/0126725 | A1 * | 6/2011 | Kolp et al. | 101/47 |

* cited by examiner

*Primary Examiner* — John Goff
*Assistant Examiner* — Hannuri L Kwon
(74) *Attorney, Agent, or Firm* — Brooks, Cameron & Huebsch, PLLC

(57) ABSTRACT

Label application devices and methods of printing and applying labels are described herein. One label application device can comprise a feed component configured to deliver a sheet of label material to a position, a product identification component configured to identify a type of a product that is approaching the position, a printing component configured to print data onto the sheet of label material, the data based on the identified type of product, a stripping component configured to remove a liner portion of the sheet of label material from a label portion of the sheet, and an applicator component configured to apply the label portion to the product.

15 Claims, 3 Drawing Sheets

LABEL APPLICATION DEVICES

BACKGROUND OF THE DISCLOSURE

Labels can include a piece of material that can be affixed to a product and can have printed data on the material. For instance, labels can be used to identify various types of products based on the data printed on the label. In some instances, labels can include a logo that identifies the source of a product and a type of the product. Sometimes a label can include a serial number and/or other identifier (e.g., bar code and radio-frequency identification) to identify the product while it is being manufactured (e.g., product identification label). The serial number and/or other identifier can be scanned during various stages of manufacture, including a stage to apply a label for customer identification (e.g., a label that is intended to identify the product for customers).

Label application devices can be used to automatically print and apply label material to products. Automatically printing and applying can refer to printing and applying label material without and/or with minimal manual labor. Label application devices can reduce an operational cost of an entity (e.g., company) by reducing workforce labor and increasing accuracy of label application.

Previous approaches for label application devices apply tension to a liner portion of the label material (e.g., media) of the label application device to remove a label portion of the label material from the liner portion, wherein the label portion is then applied to a product. The label portion of the label material is removed by applying vacuum pressure to the label portion and, using tension applied to the liner portion, bending the label material around a corner (e.g., a sharp downward corner) so that the liner portion is removed (e.g., stripped) from the label portion. However, applying tension to liner portion of the label material of a label application device can cause stress to a printing component of the label application device.

DETAILED DESCRIPTION OF THE DISCLOSURE

Figure 1:
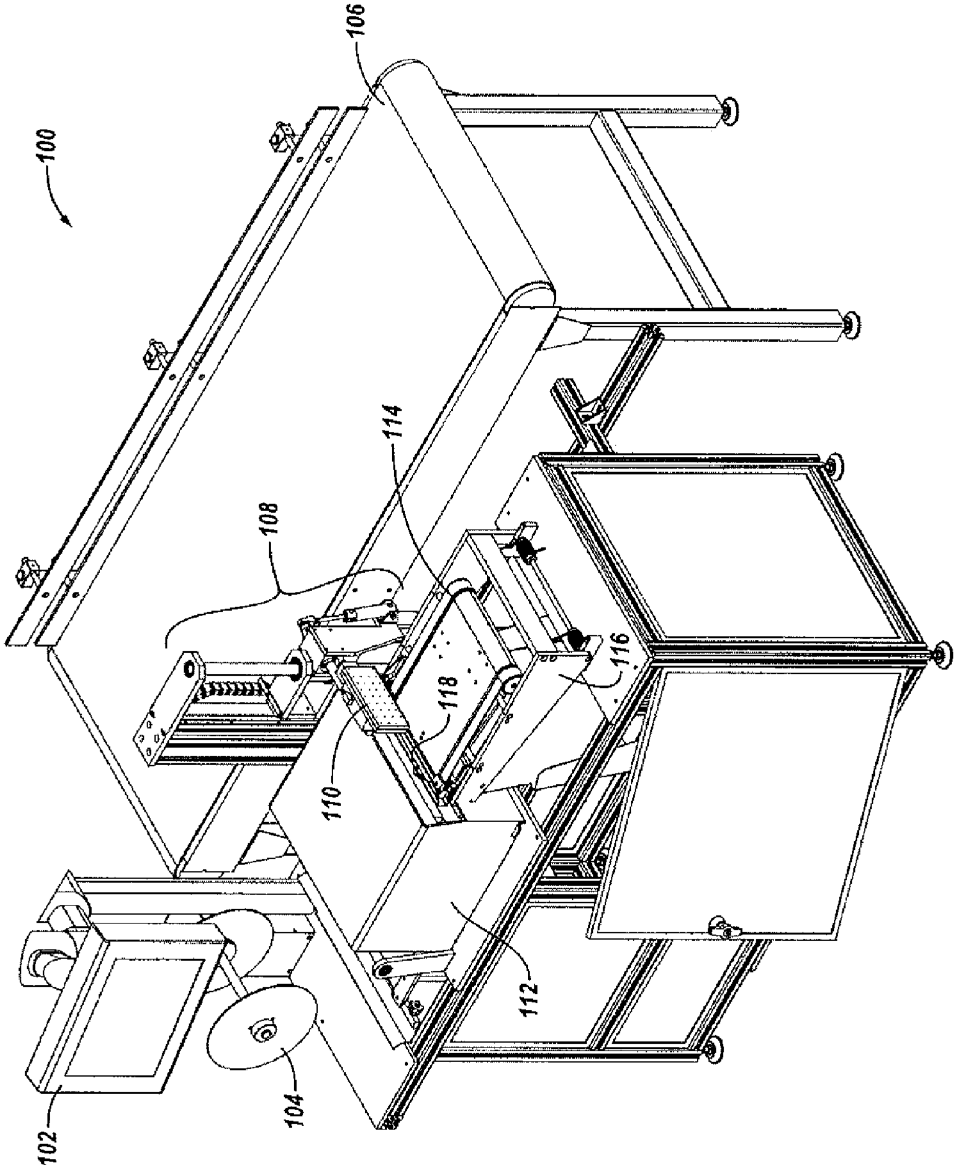
FIG. 1 illustrates a label application device in accordance with one or more embodiments of the present disclosure.

Label application devices and methods are described herein. For example, in one or more embodiments of the present disclosure a label application device can comprise a feed component configured to deliver a sheet of label material to a position, a product identification component configured to identify a type of a product that is approaching the position, a printing component configured to print data onto the sheet of label material, the data based on the identified type of the product, a stripping component configured to remove a liner portion of the sheet of label material from a label portion of the sheet, and an applicator component configured to apply the label portion to the product.

Previous approaches to a label application device transfer label material comprised of a plurality of individual labels (e.g., label portion of the label material to be applied to a product) tacked on a continuous backing strip (e.g., liner portion of the label material) through a label feedpath. Data can be printed on the individual labels and the labels can be separated from the backing strip to be applied to a product. To transfer the label material and separate the individual labels, the backing strip can be engaged by an advancing wheel that is rotatable. The advancing wheel can be intermittently rotated and stopped at a length of each individual label. The backing strip is turned around a corner (e.g., a sharp downward corner) and around a turning pin, which separates each individual label from the backing strip. Each separated individual label can be applied to a product.

In some instances, a plurality of individual labels can be printed in advance. For example, if an order of a plurality of products is identified in advance of reaching a position to have a label applied, a loop of a plurality of labels can be used. A loop of a plurality of labels, as used herein, can include a loop of a plurality of individual labels with data printed on the labels based on the previously identified order of the plurality of products and tacked onto a continuous backing strip. The plurality of labels can be in queue (e.g., waiting in an order) to be applied to the plurality of products. The plurality of individual labels in the loop can be separated from the continuous backing strip after traveling the loop and bending the continuous backing strip around a corner and/or a turning pin to separate each individual label from the backing strip. However, such approaches apply tension to the liner portion of the label material of the label application device (e.g., tension is applied during printing and to strip the liner). Tension applied to the liner portion of the label material can negatively affect a printing component of the label application device. Further, a loop of a plurality of labels can result in errors in data printed on the label due to inaccurate identification of an order of products.

In contrast, embodiments of the present disclosure can include a label application device that does not apply tension to a liner portion of label material of the label application device by a feed component and can print individual labels as a product is identified (e.g., on-demand printing). By not applying tension to a liner portion of the label material of the label application device (e.g., no tension applied by a feed component and/or during printing), the label application device may last a longer duration and/or have fewer maintenance issues (e.g., breaks and repairs) as compared to a tension applying solution.

For example, label application devices in accordance with one or more embodiments of the present disclosure may include a printing component to print data onto a sheet of label material, the data based on an identified type of product, and an application component to apply the label portion of the sheet of label material to a product. The label application devices can allow for an automatic printing and applying solution that does not apply tension to the liner portion of the label material during printing of the data. Label application devices, in accordance with one or more embodiments, can offer a user a variety of delivery options (e.g., print and apply, partially pre-printed sheets, and on-demand, as discussed further herein). Further, a user can print and apply individual labels in a 1:1 manner (e.g., zero queue) allowing for greater accuracy in printing and application of labels as compared to printing in a loop.

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 214 in FIG. 2. As will be appreciated, elements shown in the various embodiments herein can be added, exchanged, and/or eliminated so as to provide a number of additional embodiments of value.

FIG. 1 illustrates a label application device 100 in accordance with one or more embodiments of the present disclosure. A label application device 100 can be used to automatically print and apply sheets of label material to products.

Label material (e.g., media), as used herein, can comprise a label portion and a liner portion. The label portion (e.g., a label) can include a piece of material that can be affixed to a product and can have printed data on the material. The label portion can include a first side capable of having data printed thereon and a second side with an adhesive layer. Example material of the label portion can include paper, polymer, cloth, and/or metal, among other material. The adhesive layer can, in some embodiments of the present disclosure, include a pressure sensitive adhesive. The liner portion can include a piece of material that the label portion is tacked on (e.g., a backing strip).

The label application device 100 of FIG. 1 can include a feed component 104 configured to deliver one or more sheets of label material to a position. Configured to, as used herein, can include able to perform and/or fit for a specific use (e.g., adapted to). A sheet of label material, as used herein, can include an individual label portion (e.g., an individual label that is not connected to another individual label) tacked onto an individual liner portion, wherein the individual label portion is to be applied to a product (e.g., an individual sheet of label material). That is, a sheet can include an individual label portion of label material sized to be applied to a product (e.g., is the approximate and/or appropriate size to be applied to the product) and tacked onto an individual liner portion (e.g. of the same and/or approximate size as the label portion). The feed component 104 can deliver sheets of label material using a drive element configured to deliver the label material along a feedpath, for instance. The feedpath can include a path from the feed component 104 to a printing component 112 to a stripping component (e.g., components 114, 116, and 118) (as discussed further herein).

In some embodiments, the feed component 104 can include a label storage and feed component. A label storage and feed component can be configured to store a source of label material and deliver the label material along a feedpath using a drive element.

The feed component 104, as illustrated in the embodiment of FIG. 1, can comprise a wheel configured to hold and rotate a roll of label material (e.g., a continuous roll of label material) and a drive element configured to deliver the label material along the feedpath. In such an instance, the label application device 100 can include a label material cutting component (not shown in FIG. 1). A label material cutting component can include a sharp edge configured to cut the roll of the label material into a plurality of sheets of label material (e.g., individual sheets). For instance, the label material cutting component can cut the roll of label material to form the sheet of label material (e.g., individual sheet). The sheets of label material can have data printed onto the label portion of each sheet (e.g., as discussed further herein).

The label material cutting component can, for instance, be attached to and/or part of a printing component 112 (as discussed further herein). The label material cutting component, in various embodiments, can be attached and/or connected (e.g., part of) to the leading end of the printing component 112 (e.g., the end of the printing component 112 that the label material is delivered to) and/or the trailing end of the printing component 112 (e.g., the end of the printing component 112 that the label material is delivered from).

Although the present embodiment illustrates a feed component 104 that comprises a wheel and a drive element, embodiments in accordance with the present disclosure are not so limited. Feed components, in accordance with one or more embodiments, can be configured to store and/or deliver a plurality of partially pre-printed sheet types and/or pre-cut sheets of label material.

A partially pre-printed sheet type can include an individual sheet of label material with data pre-printed on the sheet based on an associated product type. A product type and/or type of a product, as used herein, can include an identification and/or categorization of a product. Example product types can include different models of a product (e.g., model 1 and model 2 vehicle tires), different brands of a product (e.g., brand A and brand B vehicle tires) and/or different products (e.g., vehicle tires and vehicle radiators), among other product types. The pre-printed data can include a subset of the data desired for and/or to be printed on each sheet.

Feed components, in some examples, can store a plurality of partially pre-printed sheet types (e.g., each in separate bins) and upon identification of a type of a product can deliver one of the particular partially pre-printed sheet types of label material along a feedpath. That is, one of the partially pre-printed sheet types can be delivered based on an association between the sheet type and the identified product type of a product in position for application of a label portion of the sheet of label material.

For instance, the partially pre-printed sheet types of label material can include partially pre-printed sheet types for product type A, product type B, and product type C. In response to identifying a product of type A in position for a label portion of a sheet of label material, the feed component 104 can retrieve a partially pre-printed product type A sheet of label material from a bin containing a plurality of partially pre-printed sheet types for product type A, and/or deliver the partially pre-printed product type A sheet along the feedpath.

In various examples, the feed component 104 can be configured to deliver pre-cut sheets of label material. Delivering pre-cut sheets of label material can be referred to as print and apply delivery. The pre-cut sheets of label material, as used herein, can include individual labels (e.g., individual sheets of label material). The pre-cut sheets can be individual sheets stored by the feed component 104 and/or can be cut from a roll of label material (e.g., by a label material cutting component).

A sheet of label material can be delivered to a printing component 112 of the label application device 100. A printing component 112 can be configured to print data onto a sheet of label material (e.g., onto the label portion of the sheet). The printed data can be based on and/or associated with an identified type of product (e.g., product type), for example. In various embodiments, the printing component 112 can be configured to hold a sheet of label material in position to print the data onto the sheet of label material. Further, the printing component 112 can perform various printing methods, such as dot-matrix, laser, thermal direct, and/or thermal transfer, among other printing methods.

In some embodiments of the present disclosure, the data printed onto the sheet can be retrieved. For instance, a product in a first position can be identified. The product can be identified using a product identification component (not illustrated in the embodiment of FIG. 1). A product identification component can, for example, be configured to identify a type of a product at the first position and/or a product approaching the first position. A first position, as used herein, can include a position for application of the label portion of the label material to a product (e.g., a position wherein the label application device 100 can apply a label portion to a product). That is, the product identification component, in various embodiments, can be configured to identify a product type of a product in position for application of a label portion of the label material (e.g., an individual sheet).

For example, identifying the product can include scanning a product identification label on the product at and/or approaching the first position. In response to the scan, the label application device 100 can translate the scanned information to identify the product and/or product type and retrieve the data to print on the label portion of a sheet of label material. The data can be stored on the label application device 100 and/or on a separate database, for instance.

A stripping component (e.g., including components 114, 116, and 118) of the label application device 100 can be configured to remove a liner portion of the sheet of label material from the label portion and/or vice versa. For example, the stripping component (e.g., components 114, 116, and 118) of the label application device 100 can be configured to grip a portion of the sheet and strip the liner portion of the sheet from the label portion. The portion of the sheet gripped can, for instance, include an edge of the liner portion of the sheet. The edge of the liner portion of the sheet gripped, in various embodiments, can include a leading edge (e.g., edge of the sheet first delivered from the printing component 112) and/or a trailing edge (e.g., edge of the sheet last delivered from the printing component 112). Stripping the liner portion from the label portion can expose the adhesive layer (e.g., the second side) of the sheet of label material that is subsequently affixed to a product. The stripping component, in various examples, can include a stripping arm 118, a conveyor belt 114, and/or a strip cradle 116 (e.g., as discussed further herein).

An applicator component (e.g., including components 108 and 110) as illustrated in the embodiment of FIG. 1, can be configured to apply the label portion to the product. For instance, the applicator component (e.g., components 108 and 110) can hold the label portion as the stripping component (e.g., components 114, 116, and 118) removes the liner portion from the label portion. In some instances, holding the label portion can include applying pressure to the label portion. The pressure can, for instance, include vacuum pressure. The pressure can be applied to the label portion of the label material to hold (e.g., retain) the label portion as the liner portion is stripped from the label portion and the label portion can be applied to the identified product.

In various embodiments, the applicator component (e.g., components 108 and 110) can move the sheet of label material above the stripping component (e.g., components 114, 116, and 118). As an example, the applicator component (e.g., components 108 and 110) can apply vacuum pressure to the label portion of the label material and, using the vacuum pressure to hold the label portion, can move the sheet of label material in a vertical direction to a position above the stripping component (e.g., components 114, 116, and 118). Moving the sheet of label material above the stripping component (e.g., components 114, 116, and 118) can allow the stripping component to strip the liner portion of the sheet from the label portion (as discussed further herein).

As illustrated in the embodiment of FIG. 1, the applicator component (e.g., including components 108 and 110) can include an advancing arm 110 and a body 108. The advancing arm 110 can, for instance, hold the label portion of the sheet of label material and the body 108 of the applicator component (e.g., components 108 and 110) can rotate about an axis to bring the advancing arm 110 with the label portion of the sheet of label material to a product.

The label application device 100, in accordance with one or more embodiments can print and/or apply the label portion of the sheet of label material to a plurality of products in a 1:1 manner (e.g., zero queue). For instance, the printing component 112 can be configured to print data and the applicator component (e.g., components 108 and 110) can be configured to apply the label portion to a plurality of products in the 1:1 manner.

As an example, a first product of a first product type can be identified, the printing component 112 can print data associated with the first product type, and the applicator component (e.g., components 108 and 110) can apply the label portion to the first product. A second product of a second product type can then be identified, the printing component 112 can print data associated with the second product type, and the applicator component (e.g., components 108 and 110) can apply the label portion to the second product.

In various examples of the present disclosure, the label application device 100 can include and/or be attached to a conveyor component 106. The conveyor component 106 can be configured to move a plurality of products to a first position. For instance, the conveyor component 106 can be configured to move a plurality of products, including the product to the first position for the label portion of the sheet of label material.

In some examples of the present disclosure, the label application device 100 can include a user interface 102. A user interface 102, as used herein, can include hardware components and/or computer-readable instruction (CRI) components for users to interact with a computing device using text commands and/or images. For instance, the user interface 102 can allow for users to interact with the label application device 100. The user interface 102 can be configured to display data and provide configuration settings. In some instances, a user can use the user interface 102 to modify data to print onto the label portion of the sheet based on the identified product type of the product using the printing component 112. For instance, the data can be modified before and/or after the product type is identified (e.g., but before the data is printed).

The label application device 100 can, for example, include a memory resource and one or more processing resources coupled to the memory resource. The label application device 100 can be in communication and/or include a tangible non-transitory computer readable medium (e.g., a memory resource) storing a set of CRIs executable by the one or more processing resources. In some embodiments, the CRI can also be stored in remote memory managed by a server and represent an installation package that can be downloaded, installed, and executed.

In accordance with one or more embodiments of the present disclosure, label application devices, such as the label application device 100 illustrated by FIG. 1, can print and apply labels to products with no tension applied to the liner portion of a sheet of label material by the label application device 100 (e.g., no tension applied to the liner portion of the label material during printing of data onto the sheet of label material and/or by the feed component 104 during removal of the liner portion of the sheet from the label portion). By not applying tension to the liner portion of the sheet of label material by the feed component 104 during removal of the liner portion of the sheet from the label portion, the label application devices and/or printing components of the devices may last a longer duration and/or result in fewer maintenance issues (e.g., breaks and repairs) as compared to previous approaches that apply tension to the liner portion of the label material (e.g., apply tension to a continuous roll of backing strip).

Further, label application devices in accordance with the present disclosure can give users various options for delivery of the label material. Example options for delivery of the label material can include print and apply (e.g., pre-cut sheets of label material), partially pre-printed sheet fed (e.g., partially pre-printed sheet types of label material for a plurality of types of products), and/or roll-fed (e.g., roll of label material that is cut into sheets of label material). In addition, one or more label application devices in accordance with the present disclosure can allow for on-demand printing (e.g., print data as the type of a product approaching the first position is identified).

Figure 2:
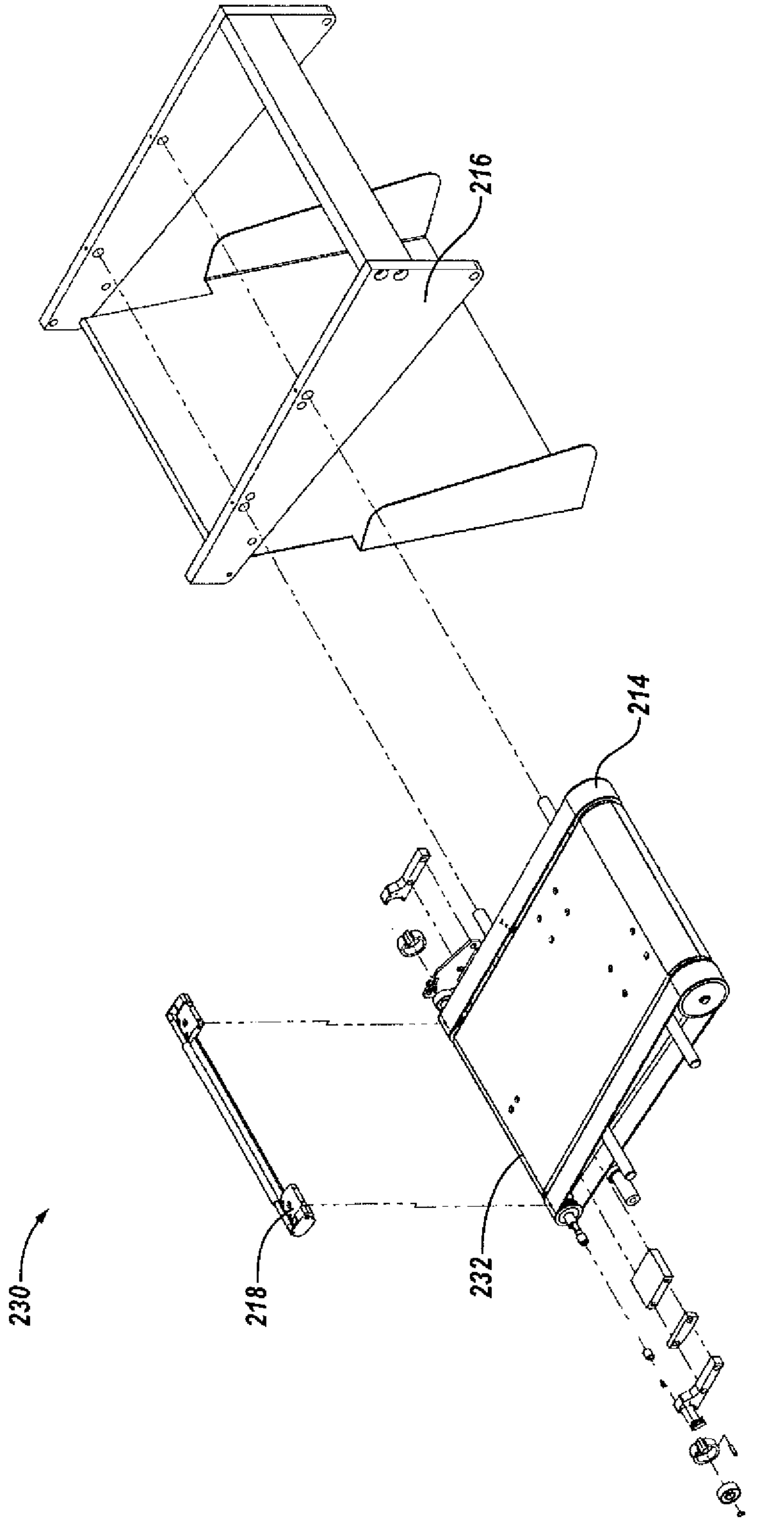
FIG. 2 illustrates a stripping component of a label application device in accordance with one or more embodiments of present disclosure.

FIG. 2 illustrate a stripping component 230 of a label application device in accordance with one or more embodiments of present disclosure. For example, the stripping component 230 of the label application device can be configured to remove a plurality of liner portions of sheets of label material (e.g., media) from a plurality of label portions. The stripping component 230 illustrated in FIG. 2, in various embodiments, can include the stripping component (e.g., including components 114, 116, and 118) illustrated in FIG. 1. Removing a liner portion from a label portion can, for instance, include not applying tension to the liner portion of the sheet of label material by the feed component (e.g., illustrated by 104 in FIG. 1) to remove the liner portion from the label portion and/or during printing of data onto the sheet.

The stripping component 230, as illustrated in the embodiment of FIG. 2, can include a stripping arm 218, a strip chassis 232, a conveyor belt 214, and/or a strip cradle 216. The stripping arm 218 can comprise a semi-circular bottom and a flat top. The strip chassis 232 can be a framework (e.g., body) of the stripping component 230 that supports the stripping component 230 and its use. The conveyor belt 214 can be configured to move the stripping arm 218 in a horizontal direction. For instance, the conveyor belt 214 can move about (e.g., around) the circumference of the strip chassis 232 to move the stripping arm 218 in a horizontal direction. The stripping arm 218 can, for example, be coupled and/or connected to the conveyor belt 214. The strip cradle 216 can be configured to support movement of the stripping arm 218 and the conveyor belt 214.

For instance, the stripping arm 218 can grip a portion of a sheet of label material and strip a liner portion from the label portion. Gripping the portion of the sheet can, for instance, include gripping an edge of the liner portion of the sheet of label material. As an example, gripping the edge of the liner portion can include nipping (e.g., pinching) the edge of the sheet to grip and/or remove the liner portion. In various embodiments, the sheet of label material can include an extra liner portion. The extra liner portion can, for instance, extend past (e.g., beyond) the label portion of the sheet of label material (e.g., the liner portion is approximately the same size as the label portion with an overhang of the extra liner portion). For example, the extra liner portion can extend a centimeter, an inch, and/or ¼ inch past the label portion, among other amounts.

As an example, the stripping arm 218 can grip the extra liner portion of the sheet of label material (e.g., after the printing component has printed data onto the sheet). The applicator component (e.g., as illustrated by 108 and 110 in the embodiment of FIG. 1) can hold the sheet of label material and move (e.g., lift) the sheet of label material above the stripping arm 218 (e.g., using the advancing arm 110 of the applicator component 108, 110, as illustrated in FIG. 1). Once the sheet of label material is above the stripping arm 218 and the stripping arm 218 has a grip on the extra liner portion, the conveyor belt 214 can move about the circumference of the strip chassis 232. The movement of the conveyor belt 214 can, for instance, move the stripping arm 218 in a horizontal direction removing the liner portion from the label portion. The horizontal movement can, in some embodiments, be right to left and/or left to right. The movement can cause a bend in the liner portion to remove the liner portion from the label portion. Removing the liner portion can include stripping the liner portion from the label portion, for example.

The conveyor belt 214 can, for example, move about the circumference of the strip chassis 232 to bring the stripping arm 218 back to the starting position (e.g., in position to grip the next sheet of label material). The stripping arm 218 can, in various embodiments, release the liner portion of the sheet of label material prior to reaching the starting position. For instance, the stripping arm 218 can release the liner portion as the stripping arm 218 is rotated to the edge and/or underneath the strip chassis 232.

Although the present embodiment illustrates the conveyor belt 214 moving about the circumference of the strip chassis 232, embodiments in accordance with the present disclosure are not so limited. For example, in some embodiments the conveyor belt 214 may not move the full circumference of the strip chassis 232. For instance, the conveyor belt 214 may move in a horizontal direction until reaching the edge of the strip chassis 232 and move back in the opposite horizontal direction (e.g., move to the right and back to the left and/or vice versa). Such movement can, for instance, move the stripping arm 218 in the horizontal direction. In such an instance, the stripping arm 218 may release the liner portion as the stripping arm 218 reaches the edge of the strip chassis 232.

Figure 3:
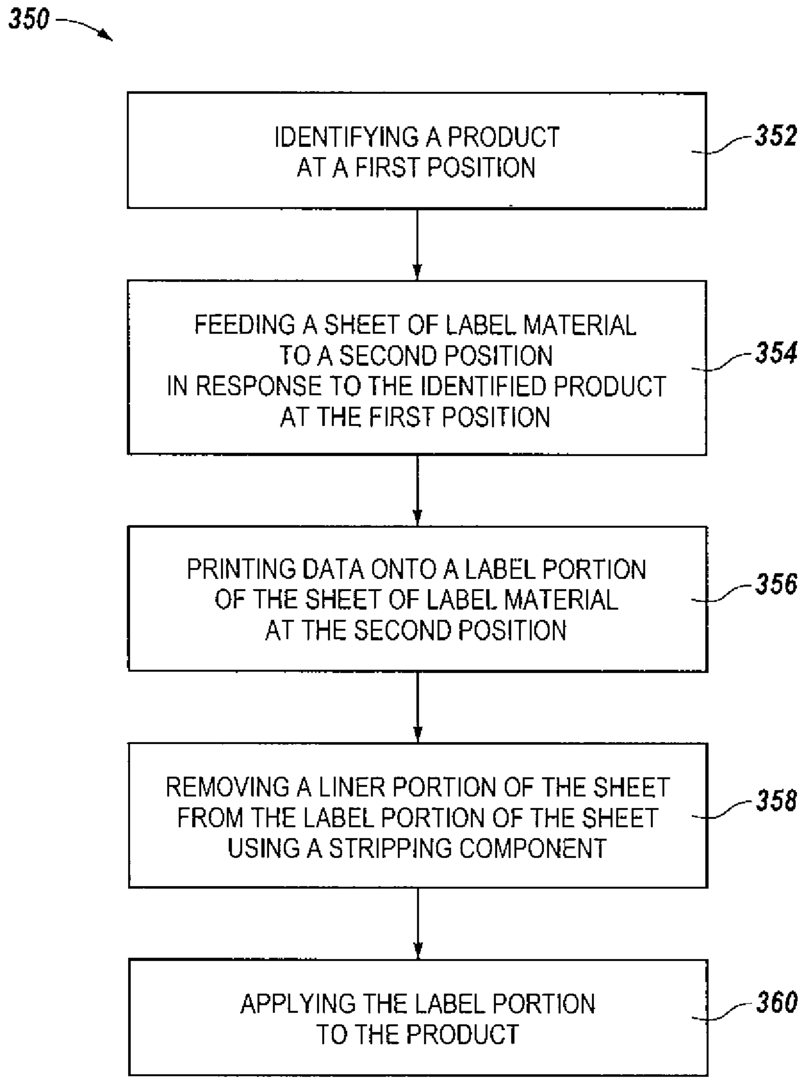
FIG. 3 illustrates an example of a method for printing and applying a label in accordance with one or more embodiments of the present disclosure.

FIG. 3 illustrates an example of a method 350 for printing and applying a label in accordance with one or more embodiments of the present disclosure. The method 350 can include using a label application device to print and apply a label. For instance, the label application device used to perform the method 350, in some embodiments, can include the devices 100 and 230 illustrated in FIGS. 1 and 2.

At block 352, the method 350 can include identifying a product at a first position. The first position can include a position that a label application device can apply a label portion of a sheet of label material to a product. In some embodiments, a type of the product approaching the first position can be identified.

In some embodiments of the present disclosure, a conveyor component can be configured to move a plurality of products to the first position for application of a label portion to each of the plurality of products. A conveyor component, as used herein, can include a conveyor belt, and a body to support the conveyor belt and/or one or more products.

At block 354, the method 350 can include feeding a sheet of label material to a second position in response to the identified product at the first position. The second position, as used herein, can include a position along a feedpath. For instance, the second position can include a position at a printing component. In some embodiments, the method 350 can include cutting a roll of the label material to form the sheet of label material (e.g., individual sheet with a label portion and a liner portion).

At block 356, the method 350 can include printing data onto a label portion of the sheet of label material at the second position. The data can be based on the identified product (e.g., the product type of the product), for example. In various embodiments, the data can be retrieved by a label application device from a database. A printing component of the label application device can be configured to print the data.

In some embodiments of the present disclosure, the data to be printed on a label portion of a sheet of label material can be modified. For instance, the modification can be based on the identified product type of the product. In some examples, the modification can be in real-time. For example, modification in real-time can include modifying data to print for a product type before and/or after the type of product is identified (e.g., identified at and/or approaching the first position). For instance, a printing component of the label application device can be configured to receive one or more instructions to modify the data to print onto the label portion of the sheet based on the identified product type of the product. A user can, for example, modify the data by accessing a database that the data is stored on and/or using a user interface component of the label application device to modify the data.

At block 358, the method 350 can include removing a liner portion of the sheet from the label portion of the sheet using a stripping component. Further, at block 360, the method 350 can include applying the label portion (e.g., label portion of the sheet) to the product. For instance, the method 350 can include applying vacuum pressure, using an applicator component, to the label portion of the sheet of label material remove the liner portion of the sheet from the label portion of the sheet. As vacuum pressure is applied, a stripping component can grip the liner portion and strip the liner portion from the label portion. The applicator component can rotate about an axis to apply the label portion to the product. In various embodiments, the applicator component can release the vacuum pressure to apply the label portion to the product.

Although specific embodiments have been illustrated and described herein, those of ordinary skill in the art will appreciate that an arrangement calculated to achieve the same techniques can be substituted for the specific embodiments shown. As one of ordinary skill in the art will appreciate upon reading this disclosure, various embodiments of the invention can be performed in one or more devices, device types, and system environments including networked environments.

Combination of the above embodiments, and other embodiments not specifically described herein will be apparent to those of skill in the art upon reviewing the above description. The scope of the various embodiments of the disclosure includes other applications in which the above structures and methods can be used. Therefore, the scope of various embodiments of the disclosure should be determined with reference to the appended claims, along with the full range of equivalents to which such claims are entitled.

In the foregoing Detailed Description, various features may have been grouped together in a single embodiment for the purpose of streamlining the disclosure. This method of disclosure is not to be interpreted as reflecting an intention that the embodiments of the invention require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A label application device, comprising:

a feed component configured to deliver a sheet of label material to a position;

a product identification component configured to identify a type of a product that is approaching the position;

a printing component configured to print data onto the sheet of label material, the data based on the identified type of product;

a stripping component configured to remove a liner portion of the sheet of label material from a label portion, wherein the stripping component includes:

a striping arm configured to grip a portion of the sheet of label material;

a conveyor belt configured to move the stripping arm in a direction to strip the liner portion from the label portion, wherein the stripping arm is coupled to the conveyor belt; and an applicator component configured to apply the label portion to the product.

2. The device of claim 1, wherein no tension is applied to the liner portion of the sheet of label material by the feed component during removal of the liner portion of the sheet from the label portion.

3. The device of claim 1, wherein the printing component is configured to print data and the applicator component is configured to apply the label portion to a plurality of products in a 1:1 manner.

4. The device of claim 1, wherein the stripping component is further configured to grip an edge of the liner portion to remove the liner portion from the label portion.

5. The device of claim 1, wherein the applicator component is further configured to hold the label portion as the stripping component removes the liner portion from the label portion.

6. The device of claim 1, wherein the printing component is further configured to hold the sheet of label material in position to print the data onto the sheet.

7. The device of claim 1, wherein the feed component includes a label storage and feed component configured to store and deliver a plurality of pre-cut sheets of label material.

8. The device of claim 1, including a label material cutting component configured to cut the label material into a plurality of sheets of label material.

9. A label application device, comprising:

a label storage and feed component configured to store a source of label material, the component having a drive element configured to deliver the label material along a feedpath;

a product identification component configured to identify a product type of a product in position for application of a label portion of the label material;

a label material cutting component configured to cut the label material into a sheet;

a printing component configured to print data onto the label portion of the sheet based on the identified product type;

a stripping component configured to grip a portion of the sheet and strip a liner portion of the sheet from the label portion, wherein the stripping component includes:

a striping arm configured to grip the portion the sheet of label material; and a conveyor belt configured to move the stripping arm in a direction to strip the liner portion from the label portion, wherein the stripping arm is coupled to the conveyor belt; and an applicator component configured to hold the label portion as the liner portion is stripped from the label portion and apply the label portion to the product.

10. The device of claim 9, wherein the stripping component includes a stripping arm comprising a semi-circular bottom and a flat top.

11. The device of claim 9, wherein the label storage and feed component is further configured to store a plurality of partially pre-printed sheet types.

12. The device of claim 11, wherein the label storage and feed component is further configured to deliver one of the partially pre-printed sheet types based on an association between the sheet type and the identified product type of the product in position for application of the label portion of the label material.

13. The device of claim 9, wherein the printing component is further configured to receive instructions to modify the data to print onto the label portion of the sheet based on the identified product type of the product.

14. The device of claim 9, wherein the applicator component is further configured to move the sheet of label material above the stripping component.

15. The device of claim 9, wherein the conveyor belt configured to move the stripping aim in the direction is further configured to:

move the stripping arm in a horizontal direction to strip the liner portion from the label portion.

* * * * *